Patented Apr. 13, 1937

2,077,366

UNITED STATES PATENT OFFICE 2,077,366

ABRASIVE BODY AND METHOD OF MAKING THE SAME

Lowell H. Milligan, Worcester, Mass., assignor to Norton Company, Worcester, Mass., a corporation of Massachusetts No Drawing. Application August 3, 1935, Serial No. 34,633

8 Claims. (Cl. 51—280)

The invention relates to abrasive wheels and a method of making the same.

One object of the invention is to provide a grinding wheel capable of grinding the very hardest substances. Another object of the invention is to provide a practical method of making a diamond grinding wheel. Another object of the invention is to provide a bond for diamond abrasive which is thoroughly practical and whereby the maximum efficiency of the grinding action of the diamonds may be attained. Another object of the invention is to provide a bond for diamond abrasive from which the diamonds may be readily recovered if desired. Another object of the invention is to provide a method of making diamond abrasive wheels of such a nature that wastage of diamonds may be readily avoided. Another object of the invention is to provide a composition of matter and a method of making a diamond abrasive body of such a nature that any desired shape of the abrasive body can be readily produced. Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein, and the scope of the application of which will be indicated in the following claims.

So far as now known the hardest substance is the diamond, and its fracturing qualities are such that it has been found to be a good abrasive medium. At the same time, under present market conditions, even in small mesh sizes the diamond is relatively expensive. It is therefore important to conserve diamond grit as much as possible.

Certain substances, such as the cemented tungsten carbides, boron carbide, and others may be efficiently ground with diamond wheels as to make the use thereof highly practical. The expense of a diamond wheel is, under present market conditions, very high, and accordingly it is desirable to keep the expense of the manufacture of diamond wheels as low as possible, at the same time avoiding waste of the diamond grit. Furthermore, in case a particular size or shape of wheel or other abrasive body becomes obsolete, it is quite desirable that the bond be such that the diamonds can be extracted therefrom without great expense and with as little injury to or destruction of the diamond grain as possible.

I take any desired grain size of diamond fragments, commercially known as "bort", which grain size may be regulated and determined by passing the bort through screens of various mesh sizes. I provide an alloy of copper and aluminum which has a specific gravity of approximately 3.5 grams per cubic centimeter, or 3.5 considering the specific gravity of water to be 1, which is the same thing. My alloy has the aforementioned specific gravity of 3.5 in the melted state as it is mixed with the diamond grains. This is approximately the specific gravity of diamond, the specific gravity of diamond being nearly the same at higher temperatures as under room conditions. In bonding the diamond grains I melt the alloy and mix into it the desired amount of diamond grains, which are then practically in suspension. Approximately 38 parts of copper to 62 parts of aluminum forms an alloy having a specific gravity of about 3.5 when melted. I may vary the proportions within substantial limits since a thick liquid, such as molten metals, will hold a comminuted substance such as diamond in suspension whenever the specific gravities are approximately the same. I may, for example, increase the amount of copper to 48 parts out of 100 because the resulting alloy has a specific gravity of about 4 when liquid and the diamond will still remain in suspension long enough so that, with fairly rapid cooling, it will be evenly distributed in the alloy. I may also reduce the amount of copper to a very small amount, as nearly pure aluminum will hold diamond dust or fine grain in suspension for a short period of time, but I prefer to use a substantial amount of copper in order to make the bond tougher.

BONDING ALLOYS FOR DIAMONDS

*Example I*

| | Parts by weight |
|---|---|
| Copper | 38 |
| Aluminum | 62 |

I prefer to form the alloy separately prior to introducing the diamond grains inasmuch as copper has a melting point of 1084° C. and aluminum has a melting point of 657° C. and the alloy has a melting point less than that of the aluminum. If I should make the alloy and introduce the diamond in the same operation, the temperature would have to be high enough to melt the copper, and in some instances and with some grit sizes of the diamond there would occur oxidation of the diamond as it was introduced, and this I desire to avoid. Accordingly I prepare the alloy in the first place, which may be done in any usual or desired manner, and for convenience in handling the alloy may be drawn into wire or ribbon form or may be produced in the form of small ingots.

I prepare any suitable size or type of mold, and the mold may be made of any material which has a melting point higher than that of the alloy, for example, cast iron. I prefer to use an open mold for convenience in introducing the diamond dust, and there are no limitations on the size or shape of the mold as any size or shape is suitable for carrying out my process and forming my composition. In the usual case, however, the mold will be in the form of a disk or annulus, generally an annulus or ring with an inside diameter only slightly less than its outside diameter. This is for the reason that on account of the expense of diamonds I prefer to mount the diamond abrasive composition on the outside of an inexpensive disk or the like in order that the inner part, which does no grinding, may be of low cost.

Having provided a quantity of the alloy specified, in a suitable mold generally in the form of an open annular mold, made of cast iron or steel, I heat the mold in any suitable manner, as by electric resistance coils or a gas flame or the like. However, I preferably keep the flame away from the top of the mold and also shield the mold in some way so that the air will be fairly quiet at the place where the diamond dust is introduced. This may be accomplished with an annular hood or ring, and the mold may be heated from the bottom.

Having weighed out the desired quantity of diamond dust or grain of the desired grit size, and having weighed out the desired quantity of metallic alloy bond described, I first place the bond piece by piece into the mold until it is entirely molten and filling the mold to the required depth. I then introduce the diamond grain in any desired manner as through a funnel, distributing it around the annulus if the mold has this shape. The mixture of liquid and diamond dust may then be stirred as with an iron rod or the like to insure distribution of the grain which will thereupon be in suspension and evenly distributed throughout the molten mass. When this is done and the liquid comes to rest, which it will do very quickly on account of its viscous nature, the electric current may be shut off, or the gas flame turned off and the material allowed to solidify. Freezing may be accelerated by introducing a blast of cold air on to the bottom of the mold at this point.

The result is a diamond abrasive bonded with the alloy described which holds the diamond in the matrix. The melting point of the alloy specified is not high enough to burn the diamonds if quickly introduced in the manner described. The bond is tough enough to hold the diamond particles for grinding upon any substance and yet will wear away rapidly enough to expose the cutting edges of the diamond for efficient grinding and abrasive action. Should it be found that the particular size of wheel is obsolete on account of commercial requirements as to the diameter or other dimensions thereof, any quantity of such wheels or annuli may be cut into small pieces by means of a shearing machine or the like and may then be used over again for the production of wheels or annuli of any desired size or shape by merely introducing fragments into the mold. The amount of diamond abrasive in the new product thus prepared may be different from that in the old, by merely adding more alloy or more diamond after the fragments have melted. Thus my method and composition have decided advantages over a diamond abrasive and bond which cannot be melted or otherwise disposed of without considerable expense.

In order to assist the bond in wetting the diamond grain I may add 1% of zinc chloride or any other suitable flux to my alloy.

Instead of aluminum I may use other metals having specific gravities less than 3.5. Examples are magnesium and silicon. Instead of copper I may use metals having specific gravities greater than 3.5. Examples are iron, nickel, antimony, tin and zinc. Magnesium may be alloyed with nickel, copper, zinc, cadmium or tin. Or magnesium and aluminum may be used together in combination with one or more of the heavier metals. Silicon may be alloyed with such metals as nickel, iron, copper or chromium. Likewise, silicon and aluminum, or silicon and magnesium may be used together in alloying with other heavier metals.

In order to obtain an alloy whose specific gravity when melted is such that diamond grains will be held substantially in suspension therein, it is desirable to choose an alloy whose specific gravity is about 3.7 at room temperature, it being necessary to allow about 0.2 grams per cubic centimeter for the differential expansion taking place between the diamond and the alloy in the temperature range between room temperature and the temperature of the melted alloy.

The alloy containing 38 parts of copper and 62 parts of aluminum by weight approximately meets this specification.

Other examples of bonding alloys for diamonds according to the invention, in which the alloys at room temperature have specific gravities of about 3.7, are as follows:

*Example II*

| | Parts by weight |
|---|---|
| Zinc | 42 |
| Aluminum | 58 |

*Example III*

| | Parts by weight |
|---|---|
| Silicon | 65 |
| Nickel | 35 |

*Example IV*

| | Parts by weight |
|---|---|
| Silicon | 67 |
| Iron | 33 |

*Example V*

| | Parts by weight |
|---|---|
| Silicon | 52 |
| Copper | 48 |

*Example VI*

| | Parts by weight |
|---|---|
| Silicon | 62 |
| Chromium | 38 |

For combinations of metals mentioned other than those whose specific gravities, as alloys, have been noted above, I proceed as follows:—

I take a diamond, of say one-half carat size, which need not be a cut diamond nor of gem quality, and selecting the lighter metal, I melt say 50 cc. thereof, and place therein the diamond, and having melted 50 cc. of the heavy metal I pour the heavy metal into the lighter one until the diamond appears. I then note the quantity of heavier metal used and derive my formula accordingly. Or, I may place the diamond in the heavier metal and stop pouring the lighter one when the diamond sinks.

The alloys made up as defined will have specific gravities when molten sufficiently close to that of the diamond at the same temperature to hold the diamond grain in suspension for a reasonable length of time so that, by sudden cooling, a solid is produced comprising a matrix of alloy having diamond grain well distributed throughout.

I desired to avoid oxidation of the diamond and also to avoid graphitization thereof. Oxidation may be avoided in the case of alloys which have a high melting point by carrying out the process in a non-oxidizing atmosphere, such as hydrogen or nitrogen. Graphitization is avoided by avoiding too high temperatures. Graphitization is a function of time as well as temperature, and when using high melting alloys I complete the casting operation rapidly to prevent graphitization. This may be done by cooling the mold as soon as the diamond grain has been introduced.

Certain advantages inhere in this manner of making a diamond abrasive wheel, for there is less tendency of the diamonds to break loose prematurely. At the same time the bond, though strong enough to hold the diamonds in place, is sufficiently soft or brittle so that it wears away rapidly enough to give the diamonds a free cutting action.

It will thus be seen that there has been provided by this invention an article, a composition and a method in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth is to be interpreted as illustrative and not in a limiting sense.

I claim:—

1. An abrasive body comprising diamond grain or grit dispersed in a bond of aluminum and a heavier metal (the molecules of each being present as such) having a specific gravity as an alloy of between 3.0 and 4.0.

2. An abrasive body comprising diamond grain or grit dispersed in an alloy comprising a bond of silicon and a heavy metal (the molecules of each being present as such) having a specific gravity as an alloy of between 3.0 and 4.0.

3. An abrasive body comprising diamond grain or grit dispersed in a bond of aluminum and copper having a specific gravity as an alloy of between 3.0 and 4.0.

4. An abrasive body comprising diamond grain or grit dispersed in a bond of aluminum and zinc (the molecules of each being present as such) having a specific gravity as an alloy of between 3.0 and 4.0.

5. The method of making an abrasive body of hard granular material bonded with a metallic bond which comprises selecting a hard abrasive, providing a quantity thereof in abrasive particle size, selecting a metal alloy which, when molten, has the same specific gravity within close limits as that of the abrasive material selected, melting the alloy, and bringing together a quantity of the abrasive and a quantity of the alloy and thereafter cooling.

6. The method of making an abrasive body of hard granular material bonded with a metallic bond, which comprises selecting one of the hard commercial abrasives, providing a quantity thereof in abrasive particle size, selecting a metal alloy which, when molten, has the same specific gravity as that of the abrasive selected within close limits, bringing a quantity of abrasive material selected and alloy selected together, the alloy being then in molten form, agitating and solidifying.

7. An abrasive body comprising diamond grain or grit dispersed in a metallic bond having a specific gravity as an alloy between 3.0 and 4.0 and consisting of an alloy of a metal heavier than the bond with one of the group of light substances which has alloying properties consisting of aluminum, silicon and magnesium.

8. An abrasive body comprising diamond grain or grit dispersed in alloy bond consisting of substantially 38 parts of copper and 62 parts of aluminum, the molecules of each being present as such.

LOWELL H. MILLIGAN.